United States Patent
Maxey

(10) Patent No.: US 6,304,643 B1
(45) Date of Patent: Oct. 16, 2001

(54) PAY PHONE DEPOSIT METHOD FOR LIMITING OVERPAYMENT BY A CUSTOMER

(75) Inventor: Richard N. Maxey, Sarasota, FL (US)

(73) Assignee: Elcotel, Inc., Sarasota, FL (US)

( * ) Notice: Subject to any disclaimer, the term of this patent is extended or adjusted under 35 U.S.C. 154(b) by 0 days.

(21) Appl. No.: 09/369,309

(22) Filed: Aug. 3, 1999

(51) Int. Cl.$^7$ ............................................. H04M 17/00
(52) U.S. Cl. ..................... 379/146; 379/147; 379/148; 379/150; 379/153; 379/155
(58) Field of Search ................................. 329/146, 147, 329/148, 149, 150, 153, 155; 194/215, 334

(56) References Cited

U.S. PATENT DOCUMENTS

| | | |
|---|---|---|
| 2,835,738 | 5/1958 | G.B. Quatman . |
| 3,699,259 | 10/1972 | Main et al. . |
| 3,760,101 | 9/1973 | Burns . |
| 4,028,494 * | 6/1977 | Zarouni ................................. 379/150 |
| 4,105,867 | 8/1978 | Levasseur et al. . |
| 4,136,262 | 1/1979 | Clark, Jr. . |
| 4,499,985 * | 2/1985 | Schuller ................................. 194/10 |
| 4,698,840 | 10/1987 | Dively et al. . |
| 4,763,769 * | 8/1988 | Levasseur ............................. 194/217 |
| 4,768,227 * | 8/1988 | Dively et al. ......................... 379/112 |
| 4,899,371 * | 2/1990 | Su ........................................ 379/146 |
| 4,905,813 * | 3/1990 | Rademacher ......................... 194/217 |
| 4,955,052 * | 9/1990 | Hussain ................................. 379/145 |
| 5,566,807 * | 10/1996 | Morun .................................. 194/217 |
| 5,898,771 * | 4/1999 | Florindi et al. ...................... 379/260 |
| 6,039,165 * | 3/2000 | Wild ..................................... 194/217 |

FOREIGN PATENT DOCUMENTS

WO 90/07166 * 6/1990 (WO) ............................. G07F/7/00

* cited by examiner

Primary Examiner—Sinh Tran
Assistant Examiner—Quoc D. Tran
(74) Attorney, Agent, or Firm—Schnader Harrison Segal & Lewis LLP

(57) ABSTRACT

A method for limiting overpayment at a coin-operated telephone is disclosed. According to the method, a customer may initiate a call by first depositing a plurality of coins and then dialing the desired number. Once the number is dialed, the phone obtains the rate and compares the rate to the value of the coins deposited. If fewer coins could not have been used, the coin accepting mechanism is inhibited and the call continues normally. If fewer than all deposited coins are required to make the call, then all the deposited coins are returned to the customer and a new deposit requested. The phone then accepts coin deposits until the call rate has been met. Once the call rate has been met, further deposits are rejected and the call continues normally. Alternatively, the customer may dial the number first. The phone then obtains the rate and requests a deposit. The customer then deposits coins until the call rate is met. Once the phone recognizes that the call rate is met, further coin deposits are refused. In either case, once the minimum deposit is satisfied, the phone allows any additional deposits to pass through to the coin return for customer retrieval.

8 Claims, 2 Drawing Sheets

PAY PHONE DEPOSIT METHOD FOR LIMITING OVERPAYMENT BY A CUSTOMER

BACKGROUND OF THE INVENTION

1. Field of the Invention

The invention relates generally to a method of accepting payment at a pay telephone. More specifically, the invention relates to a method of limiting overpayment at a coin-operated telephone. Most specifically, the invention relates to a method of limiting overpayment by inhibiting a coin accepting mechanism within the telephone once a minimum deposit has been met.

2. Description of the Related Art

Coin-operated telephones have been in use for decades. Although many improvements have been made to these pay phones over the years, most pay telephones in the United States do not give change after call connection, regardless of the amount deposited. Most public telephones in use today hold the coin deposit in an escrow, until the call connection is made. Before the connection is made, the customer can stop the call and get a return of all coins in escrow. Once the connection is made however, the customer cannot receive any return. Often, the customer inadvertently deposits more money into the phone than is necessary for the call. Thus, the customer loses that additional amount.

By contrast, many European and African phones operate under a best change theory. These systems collect and hold deposited coins until a charge has been made. A coin is released for payment during the call only after a sufficient charge is incurred. Upon hang up or discontinuance of the call, the remaining charge due is calculated, and the lowest denomination coin to satisfy that charge is collected by the phone. The remaining coins are returned to the customer.

With the myriad of choices available in the telephone market, even among public telephones, it is necessary for the telephone owner to be competitive to lure calling customers. One way of being competitive is to ensure a customer is not overpaying for service. For this reason, among others, it is desirable to have a method for limiting overpayment at public coin-operated telephones.

Additionally, foreign telephone companies which are used to the best change telephones, are reluctant to purchase or use public telephones without overpayment protection. Therefore, it is desirable to include a method for limiting overpayment in public coin-operated telephones.

SUMMARY OF THE INVENTION

The current method is for use in coin-operated telephones. According to the invention, a coin-operated telephone inhibits a coin-accepting mechanism to refuse coins deposited in excess. In one embodiment, the method ensures that all deposited coins are necessary, while another embodiment simply refuses coins after the minimum deposit has been made.

DETAILED DESCRIPTION OF THE INVENTION

Typically, one of two call scenarios occur at a coin-operated telephone. A customer may deposit coins prior to dialing, or may deposit coins after dialing and being informed of the required deposit. In either scenario, a customer may inadvertently deposit more coins than are needed to make the call.

Figure 1:
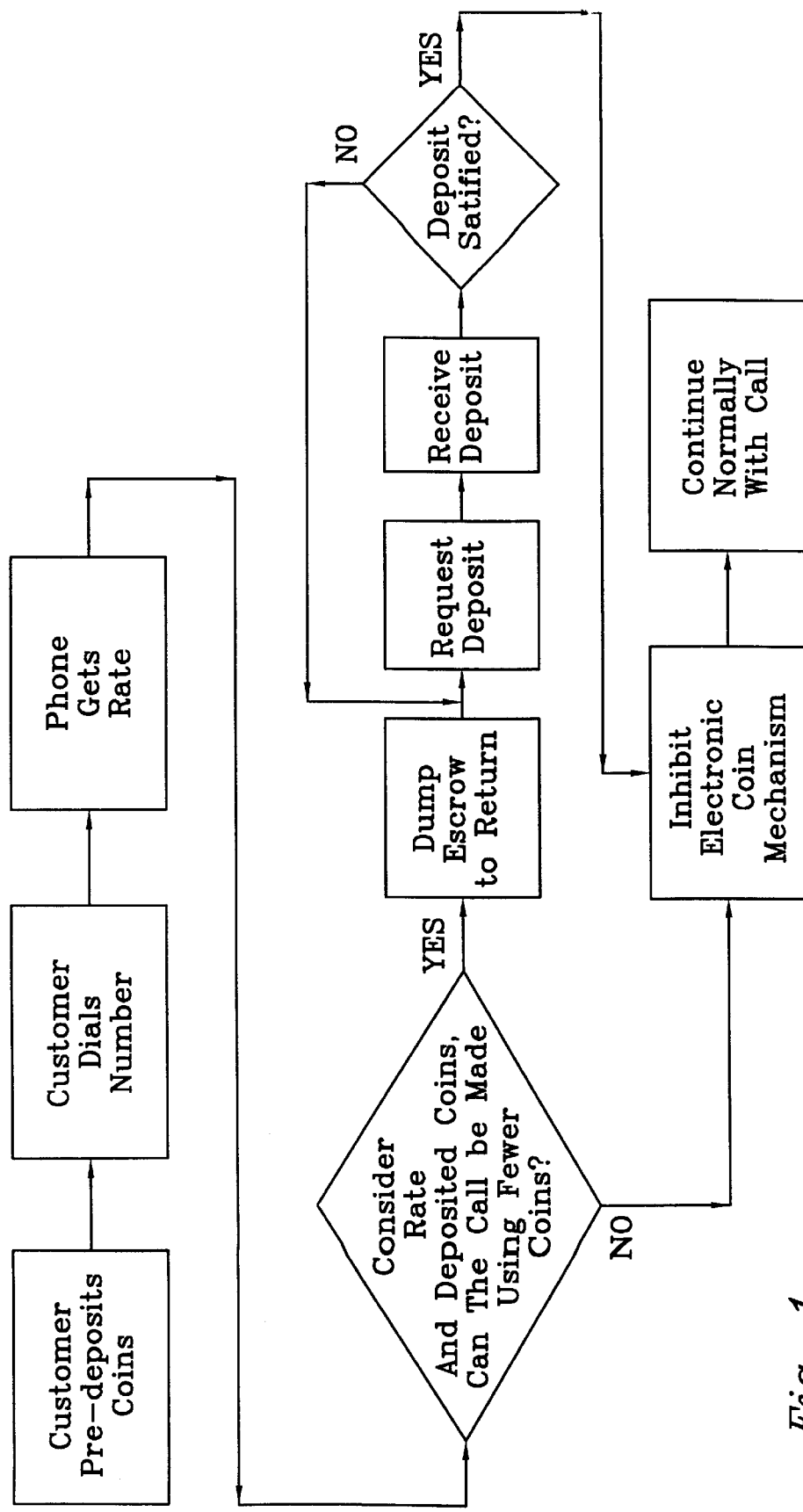
FIG. 1 is a flowchart of a pre-dialing payment method according to the invention.

According to the invention, a method for limiting overpayment is provided. First, a coin-operated telephone is provided with a coin mechanism having escrow capability, as is now common in the pay telephone industry. A customer then initiates a calling sequence, usually by lifting the receiver handset. In the first scenario as shown in FIG. 1, the pre-dialing payment scenario, the customer deposits a plurality of coins, preferably of various denominations. Because the customer has not yet dialed the number, this is a blind deposit where the customer does not know the call rate. Next, the customer dials the desired telephone number. Once dialing is complete, the phone obtains and determines the calling rate. After the rate is ascertained, the telephone determines whether a sufficient deposit has been made as in conventional telephones. If the minimum deposit has not been satisfied, the phone requests an additional deposit. If, however, the minimum deposit is met, the phone, according to the invention method, then determines whether the minimum deposit required could have been made with fewer than all of the deposited coins.

In determining whether fewer coins could have been deposited, any suitable calculation may be used. Minimally, however, to determine whether fewer coins could have been deposited, the telephone identifies the smallest denomination coin deposited. The phone then calculates whether the minimum call rate would be satisfied without that lowest denomination coin. If the minimum deposit would be satisfied, then fewer coins could have been deposited.

The call is allowed to proceed if the phone determines that the minimum deposit has been met and fewer coins could not have been deposited. The coin accepting mechanism is inhibited from accepting more coins to prevent extraneous deposits during the life of the call. Once the coin mechanism is inhibited, newly deposited coins pass directly through to the return for customer retrieval.

If fewer coins could have been deposited, all of the coins are released from escrow and the phone requests the required minimum deposit. The phone enters a deposit scenario where the rate is known prior to deposit. The user inserts coins as a deposit. The telephone now determines whether the call rate has been met as the coins are deposited. Once the call rate is satisfied, the coin accepting mechanism is inhibited and any additional deposit is rejected. Then the call continues normally.

For example, a customer desiring to make a call lifts the handset from the telephone and deposits forty-five cents ($0.45), a quarter ($0.25), a dime ($0.10) and two nickels (2×$0.05). The customer then dials a telephone number and the phone obtains the rate. If the phone returns a rate of forty cents ($0.40), the phone will calculate that the customer has deposited an additional five cents ($0.05) because a second nickel ($0.05) was deposited. The phone will then return all coins deposited and request a new deposit of forty cents ($0.40). At this point, the phone enters a post-dialing payment scenario. The phone will now accept coins only until the call rate has been met. The customer will then be able to deposit the exact change and will have saved a nickel ($0.05).

By contrast, had the customer deposited fifty cents ($0.50), in the form of two quarters (2×$0.25), the call would have been allowed. Both of the deposited coins are necessary because without either one, the minimum deposit would not be met. Thus, the phone will allow overpayment, but only to the extent that each coin is needed to make the minimum deposit.

Figure 2:
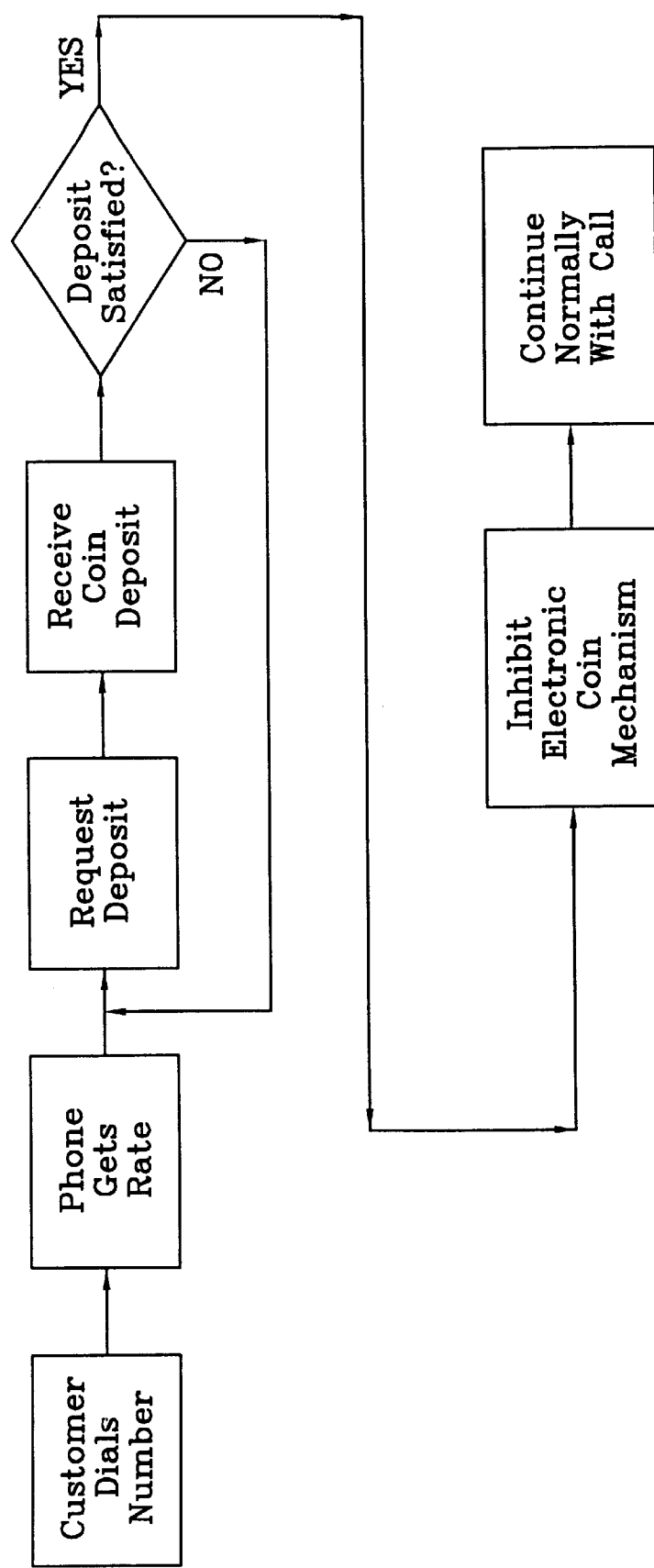
FIG. 2 is a flowchart of a post-dialing payment method according to the invention.

The second scenario, shown in FIG. 2, is the post-dial payment scenario. The customer initiates the calling sequence by lifting the handset and dialing the desired telephone number. The telephone then obtains a call rate, and requests a deposit. The user inserts coins to satisfy the deposit requirement. The telephone determines whether the minimum deposit has been met as the coins are deposited. Once the deposit has been met, the telephone inhibits the coin acceptor mechanism which passes additionally deposited coins to the coin return for customer retrieval.

In the same forty cent ($0.40) call as above, if the customer deposits a quarter ($0.25), a dime ($0.10) and two nickels ($0.05), the coin accepting mechanism is inhibited after the deposit of the first nickel ($0.05), and the second nickel ($0.05) is returned to the customer. Had the customer deposited the two nickels before the dime, the phone would accept the dime because the minimum call rate had not yet been satisfied. It, therefore, is beneficial to the calling customer to deposit larger denomination coins before smaller denomination coins.

The methods are most easily implemented by use of a microprocessor which controls an electronic coin accepting mechanism. The microprocessor is generally contained in a separate phone control module which controls various aspects of phone operation. Such systems are in use and existence today, and the method may be introduced through appropriate software updates. The microprocessor is in communication with the coin acceptor mechanism and a coin relay. The microprocessor gathers information from the coin mechanism, evaluates the information and sends instructions to the coin relay. If the coin acceptor mechanism is inhibited, it rejects coins for customer retrieval.

In each of the scenarios, the methods limit overpayment at the pay telephone by inhibiting the coin accepting mechanism once the minimum deposit has been met.

It is important to recognize that because different calling customers will initiate calls differently, the phone should incorporate methods to handle both the pre-dialing payment scenario and post-dialing payment scenario.

What is claimed is:

1. A method of limiting overpayment at a coin-operated telephone having a coin accepting mechanism with escrow capability, said method comprising the steps of:
    a. initiating a calling sequence;
    b. receiving a plurality of coins as a deposit via said coin accepting mechanism;
    c. holding said coins in escrow;
    d. accepting customer number input;
    e. determining a call rate;
    f. calculating whether fewer than all of said deposited coins are needed to satisfy said call rate;
    g. if fewer of said deposited coins could be deposited, returning said deposited coins from escrow, requesting a new deposit, and returning to said calculating step (f) above;
    h. inhibiting said coin accepting mechanism; and
    i. continuing said calling sequence.

2. The method of claim 1, wherein said coin accepting mechanism has a microprocessor controller.

3. The method of claim 1 wherein said calculating step (f) comprises the steps of:
    a. identifying the lowest denomination coin deposited;
    b. determining a value of said coins deposited;
    c. calculating a difference between said value and said call rate, if any; and
    d. determining whether said difference at least equals the value of said lowest denomination coin deposited.

4. A method of limiting overpayment at a coin-operated telephone having a coin accepting mechanism with escrow capability, said method comprising the steps in order of:
    a. initiating a calling sequence by customer number input;
    b. determining a call rate;
    c. requesting a deposit from the customer;
    d. receiving a deposit via said coin accepting mechanism;
    e. calculating whether the call rate has been met;
    f. repeating the requesting and receiving deposit steps (c) and (d) until the call rate has been met;
    g. inhibiting the coin accepting mechanism so that any further deposit is rejected; and
    h. continuing the calling sequence.

5. The method of claim 4, wherein said coin accepting mechanism has a microprocessor controller.

6. A method of limiting overpayment by a customer at a coin-operated telephone having a coin accepting mechanism with escrow capability, said method comprising the steps of:
    a. initiating a calling sequence;
    b. receiving a plurality of coins as a deposit via said coin accepting mechanism;
    c. holding said coins in escrow;
    d. accepting customer number input;
    e. determining a call rate;
    f. calculating whether fewer than all of said deposited coins are needed to satisfy said call rate;
    g. if fewer of said deposited coins could be deposited, returning said deposited coins from escrow, and if fewer of said deposited coins could not be deposited, skip steps h–k;
    h. requesting a deposit from the customer;
    i. receiving a deposit via said coin accepting mechanism;
    j. calculating whether the call rate has been met;
    k. repeating the receiving deposit and calculating steps (d) and (e) until the call rate has been met;
    l. inhibiting the coin accepting mechanism so that any further deposit is rejected; and
    m. continuing the calling sequence.

7. The method of claim 6, wherein said coin accepting mechanism is operatively connected to a microprocessor controller.

8. The method of claim 6 wherein said calculating step (f) comprises the steps of:
    a. identifying the lowest denomination coin deposited;
    b. determining a value of said coins deposited;
    c. calculating a difference between said value and said call rate, if any; and
    d. determining whether said difference at least equals the value of said lowest denomination coin deposited.

* * * * *